(12) United States Patent
Holsinger et al.

(10) Patent No.: US 9,137,295 B2
(45) Date of Patent: Sep. 15, 2015

(54) DETERMINING AUDIENCE ENGAGEMENT LEVELS WITH PRESENTATIONS AND PROVIDING CONTENT BASED ON THE ENGAGEMENT LEVELS

(71) Applicant: Mindshare Networks, Eagle, ID (US)

(72) Inventors: Kenneth Holsinger, Eagle, ID (US); Casey McMullen, Eagle, ID (US); Justin Foster, Eagle, ID (US); Evanson Baiya, Eagle, ID (US)

(73) Assignee: Mindshare Networks, Eagle, ID (US)

( * ) Notice: Subject to any disclaimer, the term of this patent is extended or adjusted under 35 U.S.C. 154(b) by 304 days.

(21) Appl. No.: 13/711,533

(22) Filed: Dec. 11, 2012

(65) Prior Publication Data
US 2013/0159460 A1    Jun. 20, 2013

Related U.S. Application Data

(60) Provisional application No. 61/576,553, filed on Dec. 16, 2011, provisional application No. 61/592,506, filed on Jan. 30, 2012.

(51) Int. Cl.
*G06F 15/16* (2006.01)
*H04L 29/08* (2006.01)
*G06Q 50/00* (2012.01)

(52) U.S. Cl.
CPC ............. *H04L 67/10* (2013.01); *G06Q 50/01* (2013.01); *H04L 67/22* (2013.01)

(58) Field of Classification Search
CPC .......... G06Q 50/01; H04L 67/10; H04L 67/22
USPC .................................... 709/217–219
See application file for complete search history.

(56) References Cited

U.S. PATENT DOCUMENTS

| | | | | |
|---|---|---|---|---|
| 6,652,283 B1* | 11/2003 | Van Schaack et al. | ........ | 434/236 |
| 8,665,333 B1* | 3/2014 | Sharma et al. | ................ | 348/159 |
| 8,769,557 B1* | 7/2014 | Terrazas | .......................... | 725/12 |
| 2007/0250428 A1* | 10/2007 | Rabenold et al. | ............... | 705/37 |
| 2008/0201448 A1* | 8/2008 | Motoyama et al. | ........... | 709/218 |
| 2013/0005443 A1* | 1/2013 | Kosta et al. | .................... | 463/25 |
| 2013/0073387 A1* | 3/2013 | Heath | ........................ | 705/14.53 |
| 2013/0073389 A1* | 3/2013 | Heath | ........................ | 705/14.54 |
| 2013/0073473 A1* | 3/2013 | Heath | ........................... | 705/319 |
| 2013/0205314 A1* | 8/2013 | Ramaswamy et al. | .......... | 725/14 |
| 2014/0058811 A1* | 2/2014 | Gorowitz et al. | .......... | 705/14.12 |
| 2014/0129942 A1* | 5/2014 | Rathod | ........................ | 715/720 |
| 2014/0205990 A1* | 7/2014 | Wellman et al. | ............. | 434/362 |
| 2014/0351835 A1* | 11/2014 | Orlowski | .......................... | 725/9 |

* cited by examiner

*Primary Examiner* — Mohamed Wasel
(74) *Attorney, Agent, or Firm* — Perkins Coie LLP

(57) ABSTRACT

When the intensity and/or emotion of audience members of a presentation is high or low, the audience members typically use social media to post indications of their excitement or disappointment. However, the raw, natural, emotional energy is dissipated during or shortly after the post without ever being efficiently monetized. This constitutes a lost opportunity for the event and/or venue owner or event presenter. However, components can determine characteristics associated with an audience's interactions during an event. The characteristics can be leveraged to harness the natural emotion and interactivity associated with the audiences for use in engaging the audience in commerce and/or improving the audience's overall experience.

36 Claims, 9 Drawing Sheets

DETERMINING AUDIENCE ENGAGEMENT LEVELS WITH PRESENTATIONS AND PROVIDING CONTENT BASED ON THE ENGAGEMENT LEVELS

CROSS-REFERENCE TO RELATED APPLICATION(S)

The present application claims priority to U.S. Provisional Application No. 61/576,553, filed Dec. 16, 2012 and entitled SYSTEMS AND METHODS FOR HARNESSING CHARACTERISTICS OF SOCIAL NETWORKS, PARTICULARLY SOCIAL NETWORKS USING PRESENTATIONS, and U.S. Provisional Application No. 61/592,506, filed Jan. 30, 2012 and entitled SYSTEMS AND METHODS FOR HARNESSING CHARACTERISTICS OF SOCIAL NETWORKS, PARTICULARLY SOCIAL NETWORKS USING PRESENTATIONS, each of which is incorporated herein in its entirety by reference.

TECHNICAL FIELD

The disclosed technology relates generally to social networks, and specifically to determining characteristics associated with an audience's interactions during an event, such as an event that presents information by way of slides or other graphical representations.

BACKGROUND

Existing marketing and audience engagement methods have limitations in maximizing audience interactivity. Current technology does not engage existing captive audiences—the people attending or viewing an event. Traditional presentation platforms use static methodologies such as banners, TV, or radio, which have low audience engagement.

Current presentations, such as slide-based presentations, are often poorly suited to quickly adapt and respond to changes in an audience's engagement, attentiveness, focus, and energy level. This can leave the audience distracted, disconnected, or bored with the presenter and/or the presentation. Limited interaction between the presenter and the audience makes it difficult to influence audience behavior and efficiently regulate information to the audience in a manner that enhances information retention and avoids information overload.

Figure 1:
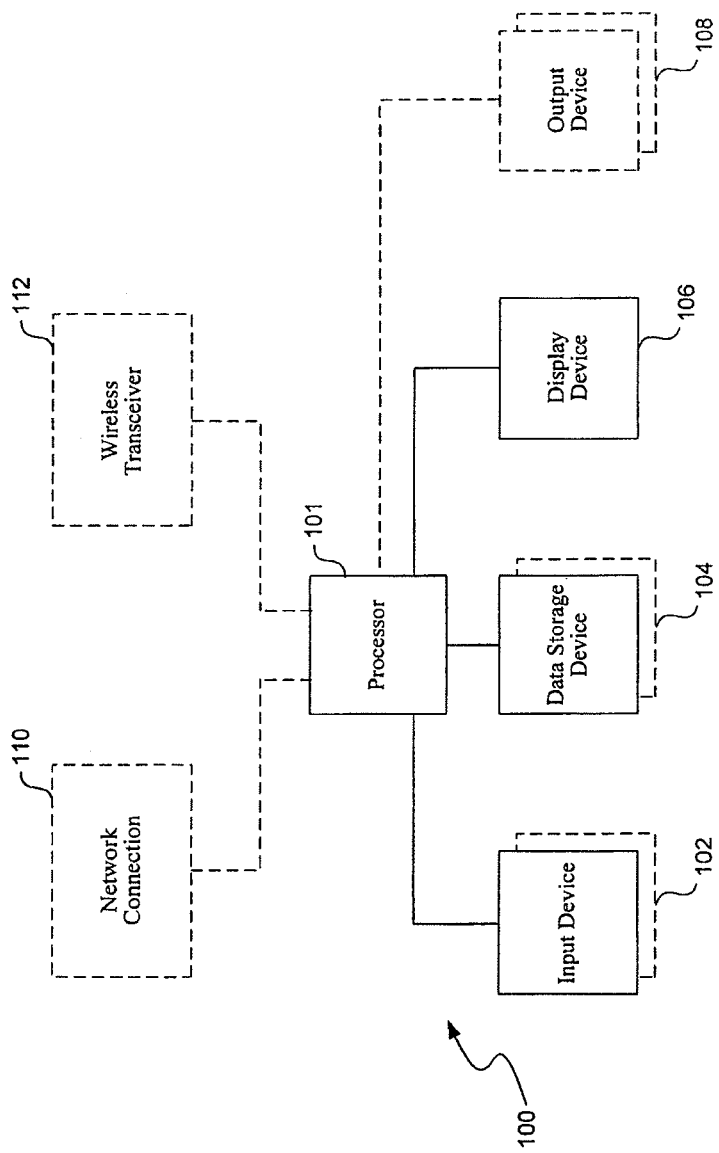
FIG. 1 is a block diagram of a basic and suitable computer that may employ aspects of the described technology.

Note: the headings provided herein are for convenience and do not necessarily affect the scope or interpretation of the described technology.

DETAILED DESCRIPTION

Currently, when the intensity and/or emotion of one or more audience members attending an event is high (or low), for example, the audience typically uses social media to post their excitement (or disappointment). However, the raw, natural, emotional energy is dissipated during or shortly after the post without ever being efficiently monetized. This constitutes a lost opportunity for the event and/or venue owner or event presenter.

In some embodiments, the described technology harnesses one or more naturally occurring human characteristics associated with an event (e.g., a live sporting event, a presentation-based event where the presenter shows slides to the audience, etc.). For example, a naturally occurring human characteristic may be an indication of one or more audience members' natural emotion, opinion, answer to a question, perception, expression, or an amount of energy, etc. (an "engagement level"). In one embodiment, professional content and interaction tracking are blended to leverage the natural emotion and interactivity associated with audiences at, or viewing, one or more live events by gathering data, engaging in commerce, and/or improving the audience's overall experience. Certain aspects of this technology relate to U.S. Provisional Application No. 61/576,553 and U.S. Provisional Application No. 61/592,506, each of which is incorporated herein in its entirety by reference.

In one or more embodiments, the described technology collects and gathers data (e.g., audience data) associated with the emotional energy of an audience associated with an event (e.g., presentation, rally, entertainment/business event). Aspects of the described technology allow audience members to use computing devices, such as mobile devices, such as smart phones, tablets, laptops, and other sources of data, to interact with presenters and venues of an event by sending the collected and gathered data for processing to determine characteristics associated with the data (e.g., the average emotional and/or intensity level of the audience).

In one embodiment the audience attends a "live" event. The audience may be physically present at or otherwise viewing the at the event as it occurs and/or associated with the event via communication technology (e.g., the Internet, a network, WIFI, mobile technology, etc.). Separately or additionally, the audience can interact or "attend" a presentation after the live event is over without loosing the experience and interactivity of attending the "live" event. For example, the described technology can differentiate and separately record various aspects of the live event, such as one or more audio streams or video streams (e.g., from the presenter's slide presentations), and one or more data streams (e.g., from audience polls, questions and answers, and other audience interaction data from the presentation). A new audience can "attend" a previously presented presentation by listening and/or viewing one or more of the recorded streams of the presentation. The new audience can participate in the same or different audience interactions (e.g., polls, voting, questions and answers, etc.) as presented to the original "live" audience. For example, the described technology can record the interactions from the new audience and aggregate that data with the original audiences' interaction data. In this way, while the new audience views and/or listens to the previously recorded video and/or audio streams, they are presented, in real-time, with the newly aggregated audience interaction data, such as consolidated answers to the original polls, voting results, questions and answers, and various audience interactions presented during the "live" presentation. This allows audiences, whether participating at a "live" or previously recorded presentation, to engage and interact with the presentation.

In one embodiment, when an intensity and/or emotional level of the audience, or one or more of its members, is at a desired level (e.g., a high-level, a low-level, a predetermined level, an automatically determined level, or a defined threshold), the audience (or a subset of the audience) receives various types of event-related content and/or requests such as one or more special offers, advertisements, surveys, contests, opportunities to purchase products, and or exclusive access to content, for example. Audience members can have content "pushed" to their mobile devices based on the intensity and/or emotional level of the audience reaching a desired engagement level as determined by the event operator; however, in other embodiments, an audience member may "pull" event-related content to their mobile device. The audience member can respond, via the client or other data source, to pushed/pulled content in accordance with the type of content received. For example, if the received content is an offer or opt-in question, the audience member can respond, via the client, by accepting/declining the offer (i.e., selecting an offer) or request, respectively. If the content is a question, a response could be an answering a question/poll. If the content requests the audience members input, the response can be free-from feedback (e.g., text) or structured content (e.g., an indicator that a button was pressed or a slider was moved, etc.)

The described technology can be implemented as hardware and/or software implemented on, and executed by, a processor. The described technology can include an event platform/management (platform) component, operated on behalf of the event operator (for example), that is capable of communicating with a thin-client component, such as an application on a smart phone. The platform component can implement, for example, a user-interface to allow event operators to control event management operations for communicating (e.g., "pushing") content to thin-client components based on the natural ebb and flow of the event. In some embodiments, the platform component has features that can measure crowd response, survey results, social "chatter," purchases, etc. Independently or in conjunction with the event management operations, the platform component may include an administrative tool that allows presentation and event management setup, as well as other administrative tools such as analytics, account management, security, and component add-ons, for example.

In one embodiment, once the audience starts to interact with event-related content via the thin-clients ("clients"), each of their interactions with the client is tracked, captured, and sent via a network to the platform component that algorithmically computes audience engagement levels (e.g., the level of excitement, the level of participation, and/or the level of interaction, etc.). In some embodiments, an engagement level is determined by analyzing/parsing free-form text, semantics, and/or binary logic received within audience content. Engagement level data can be reported to the presenter and/or event administrator and, based at least on the particular levels of engagement of the audience, a feature of the embodiment can request that the audience participate in an instant event, thereby taking advantage of the intensity and emotion of the moment. Examples of an instant event may include, among others, voting, taking a survey, purchasing a product/service, inviting a friend, answering a question, sharing a feeling/idea with the rest of the audience, etc.

To perform some or all of the above-described (and additional) features, the platform component is associated with administrative components, such as a backend portal component, a data processing engine component, and a smart editor component; however, one or more features may be performed by a single component or a combination of components.

In some embodiments, the backend component can implement application settings and the display of content; the data process engine component can gather and analyze content and display it via the backend component; the smart editor component can enable the creation of content that is displayed to a user; an e-commerce portal, which is an optional part of the embodiment, can process and monitor purchases of products/services; and the thin-client component can enable an audience member's thin client to access event content or interact with others during an event.

Techniques of the described technology can be utilized in various scenarios and should not be limited to a particular implementation or embodiment. For instance, the described technology may be utilized in slide presentations, political and non-political rallies, and general events, such as sporting and social events. Furthermore, aspects of the described technology can be readily utilized by venue/event managers and those involved in professional/business and non-professional/educational presentations, concerts, Internet-based presentations, tradeshows, radio shows, TV shows, and venue-centric events, for example.

Various embodiments of the technology will now be described. A particular emphasis is provided for using the technology with presentations to display information, such as graphics, video, audio, text, or a combination thereof, normally in the form of a slide show. The slide show is created or edited, typically by a presenter, and presented to an audience member, who may be physically present or participating remotely.

The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

FIG. 1 and the following discussion provide a brief, general description of a suitable computing environment in which aspects of the described technology can be implemented. Although not required, aspects of the technology may be described herein in the general context of computer-executable instructions, such as routines executed by a general or special purpose data processing device (e.g., a server or client computer). Aspects of the technology described herein may be stored or distributed on tangible computer-readable media, including magnetically or optically readable computer discs, hard-wired or preprogrammed chips (e.g., EEPROM semi-conductor chips), nanotechnology memory, biological memory, or other data storage media. Alternatively, computer implemented instructions, data structures, screen displays, and other data related to the technology may be distributed over the Internet or over other networks (including wireless networks) on a propagated signal on a propagation medium (e.g., electromagnetic wave(s), sound wave(s), etc.) over a period of time. In some implementations, the data may be provided on any analog or digital network (packet switched, circuit switched, or other scheme).

The described technology can also be practiced in distributed computing environments, where tasks or components are performed by remote processing devices, which are linked through a communications network, such as a Local Area Network ("LAN"), Wide Area Network ("WAN"), or the Internet. In a distributed computing environment, program components or sub-routines may be located in both local and remote memory storage devices. Those skilled in the relevant art will recognize that portions of the described technology may reside on a server computer, while corresponding portions reside on a client computer (e.g., a thin-client). Data structures and transmission of data particular to aspects of the technology are also encompassed within the scope of the described technology.

Referring to FIG. 1, in some embodiments, the described technology employs a computer 100, such as a personal computer, workstation, tablet, or smart phone, having one or more processors 101 coupled to one or more user input devices 102 and data storage devices 104. The computer is also coupled to at least one output device, such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard, keypad, touch screen, and/or a pointing device, such as a mouse. Other input devices are possible, such as a microphone, joystick, pen, game pad, scanner, digital camera, video camera, etc. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a local area network (LAN), wide area network (WAN), or the Internet (not shown in FIG. 1).

Figure 2:
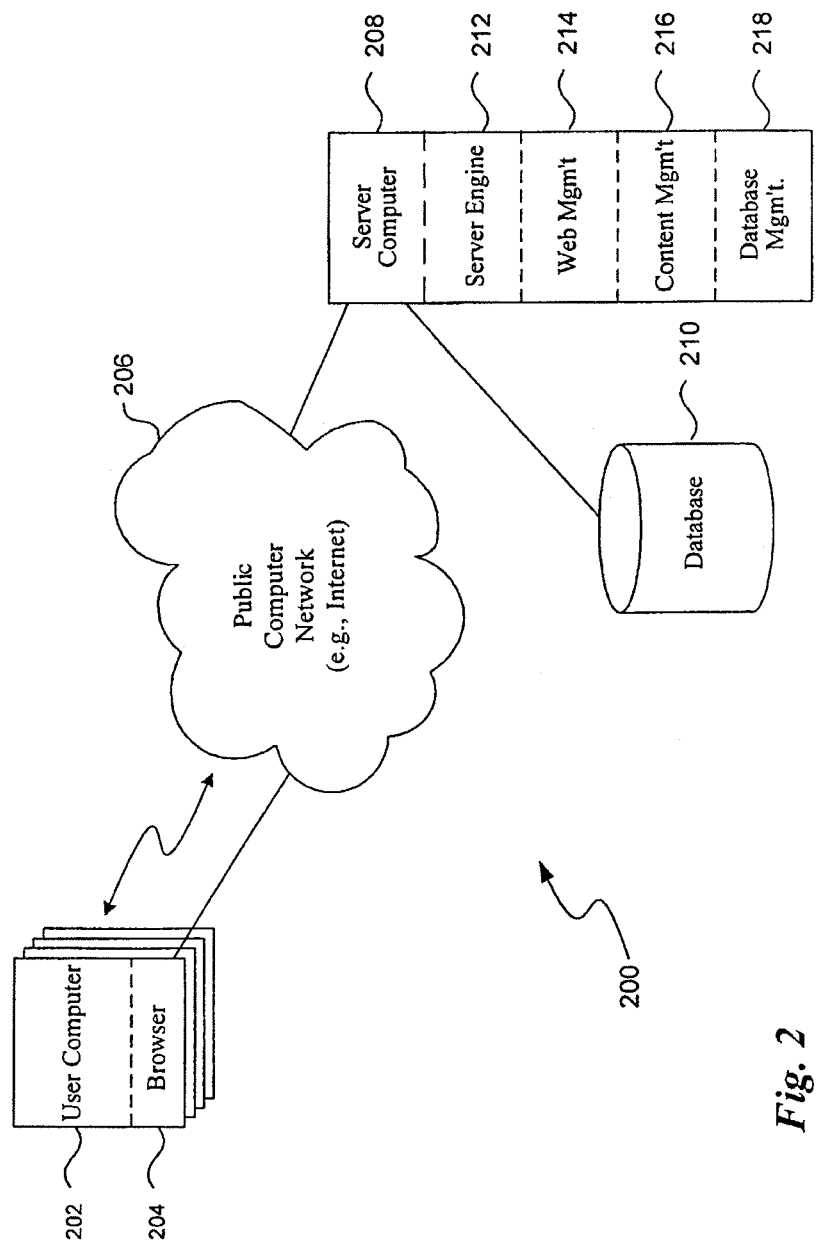
FIG. 2 is a block diagram illustrating a simple, yet suitable system in which aspects of the described technology may operate in a networked computer environment.

Aspects of the described technology may be practiced in a variety of other computing environments. For example, referring to FIG. 2, a distributed computing environment with a web interface includes one or more user computers 202 (e.g., mobile devices) in a system 200, each of which includes a browser program component 204 (e.g., a thin-client component) that permits the computer to access and exchange data with the Internet 206, including web sites within the World Wide Web portion of the Internet. The user computers 202 may be substantially similar to the computer described above with respect to FIG. 1. User computers 202 may be personal computers (PCs) or mobile devices, such as laptops, mobile phones, or tablets. The user computers 202 may connect to the Internet 206 wirelessly or through the use of a wired connection. Wireless connectivity may include any form of wireless technology, such as a radio access technology used in 2G/3G/4G or other mobile standards. User computers 202 may include other program components, such as an operating system, one or more application programs (e.g., word processing, spread sheet applications, or Internet-enabled applications), and the like. The computers may be general-purpose devices that can be programmed to run various types of applications, or they may be single-purpose devices optimized or limited to a particular function or class of functions. More importantly, while shown with web browsers, any application program for providing a graphical user interface to users may be employed, as described in detail below; the use of a web browser and web interface are only used as a familiar example here. For example, a mobile application, or "App," has been contemplated, such as one used in Apple's® iPhone® or iPad® products, Microsoft® products, Nokia, or one used in Android®-based products.

At least one server computer 208, coupled to the Internet or World Wide Web ("Web") 206, performs some or all of the functions for receiving, routing, and storing electronic messages, such as web pages, audio signals, and electronic images. While the Internet is shown, a private network, such as an intranet, may indeed be preferred in some applications. The network may have a client-server architecture, in which a computer is dedicated to serving other client computers, or it may have other architectures, such as a peer-to-peer, in which one or more computers serve simultaneously as servers and clients. A database 210 or databases, coupled to the server computer(s), stores many of the web pages and content exchanged between the user computers. The server computer (s), including the database(s), may employ security measures to inhibit malicious attacks on the system and to preserve integrity of the messages and data stored therein (e.g., firewall systems, secure socket layers (SSL), password protection schemes, encryption, and the like).

The server computer 208 may include a server engine 212, a web page management component 214, a content management component 216, and a database management component 218. The server engine performs basic processing and operating system level tasks. The web page management component handles creation and display or routing of web pages. Users may access the server computer by means of an associated URL. The content management component handles most of the functions in the embodiments described herein. The database management component includes storage and retrieval tasks with respect to the database, queries to the database, and storage of data. In some embodiments, multiple server computers 208, each having one or more of the components 212-218, may be utilized.

Figure 3:
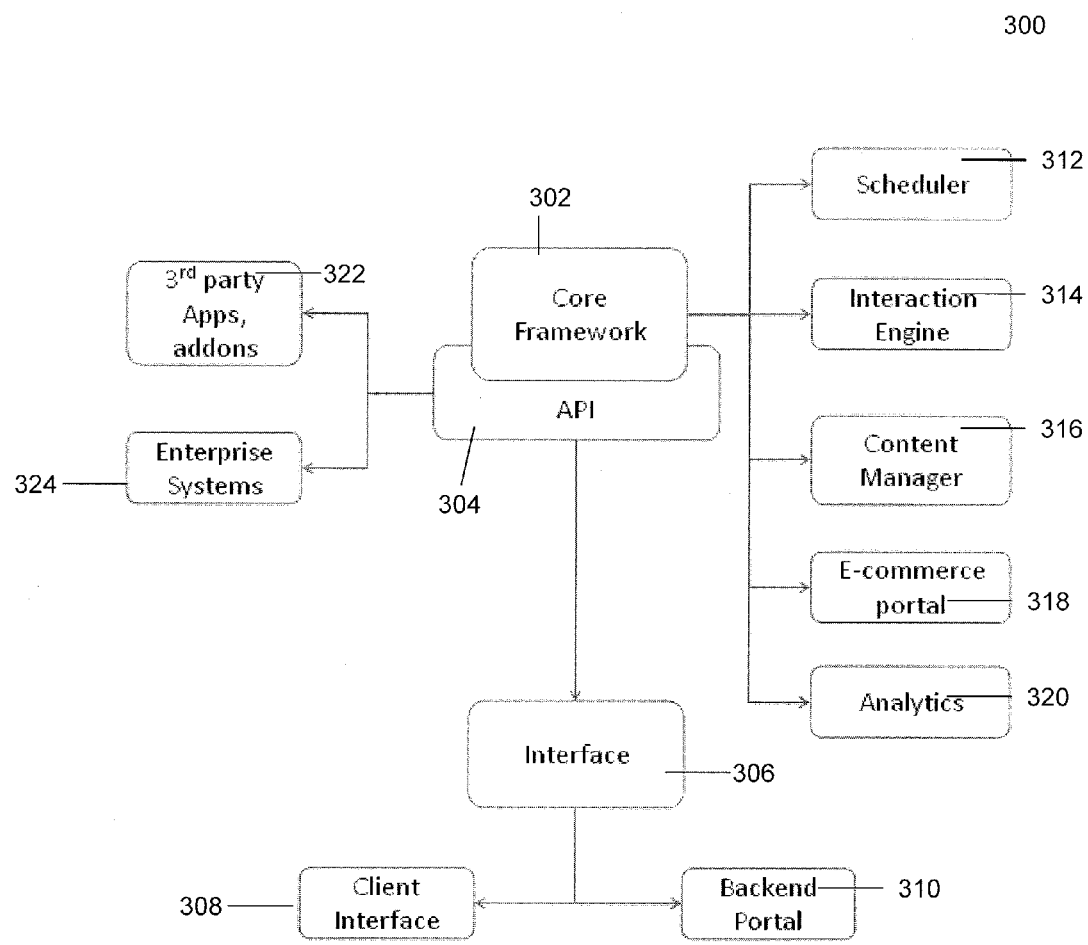
FIG. 3 is a block diagram illustrating simple, yet suitable components that employ aspects of the described technology.

FIG. 3 is a block diagram 300 illustrating simple, yet suitable components that employ aspects of the described technology; for example, as implemented with server computer 208 and client 202. The server 208 can implement a core framework 302 that is capable of performing various features of the described technology, some of which are implemented by an application program interface, or API 304. API 304 has interfaces that allow the core framework 302 to communicate to third-party Apps and add-ons 322, Enterprise Systems 324 (e.g., Facebook®, Google®, Twitter®, Yelp®, LinkedIn®, etc.). Interface 306 allows the core framework 302 to communicate with clients 308 (e.g., thin-client components at a mobile device), and to provide backend access 310 to the core framework 302. The core framework 302 can contain several components 312-320 that perform various functions, such as scheduling 312, interacting with audience members 314, managing content 316, e-commerce 318, and analyzing data 320. Though each component 312-320 is shown as a separate entity, functionality may be coalesced into one or more components of the core framework.

Figure 4:
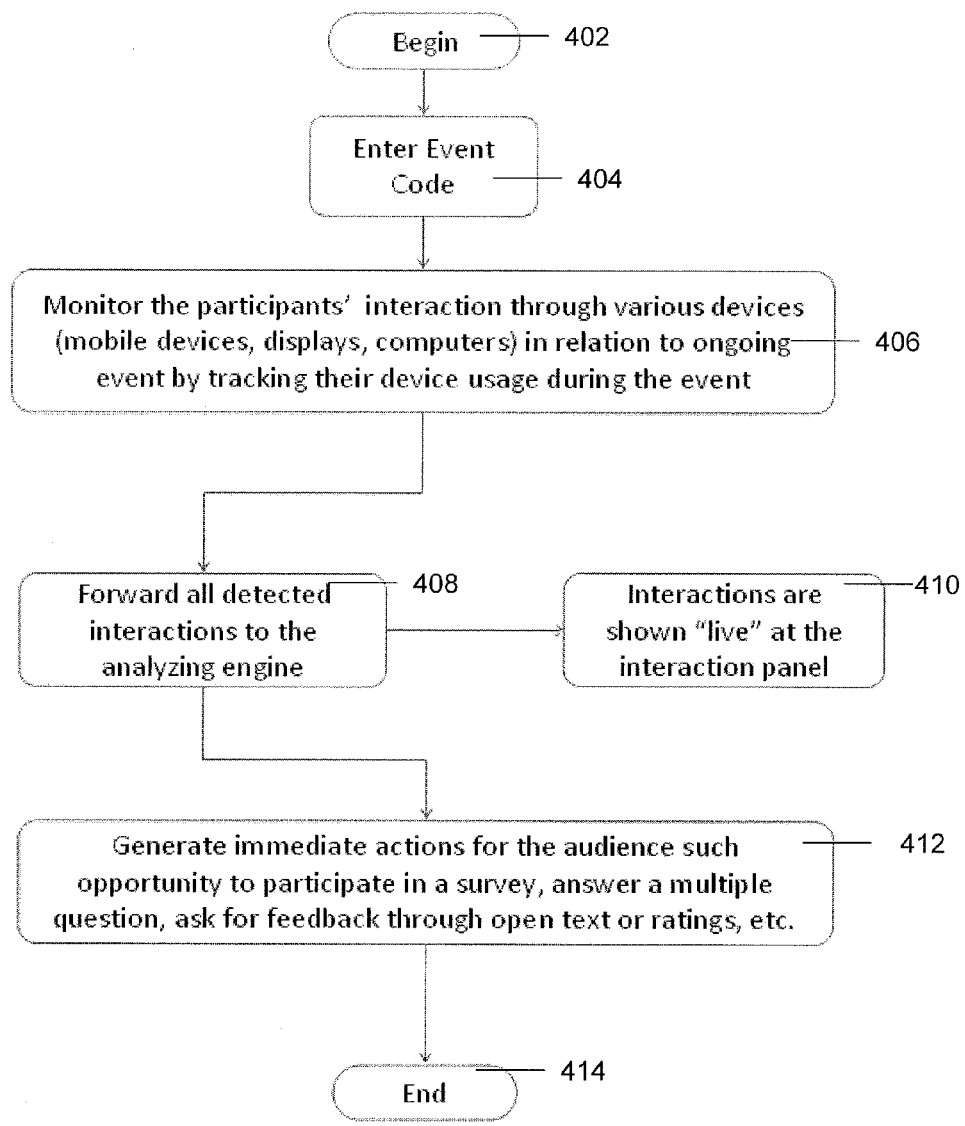
FIG. 4 is a flow diagram illustrating the operation of a possible implementation of an embodiment for monitoring social characteristics associated with an event.

FIG. 4 is a flow diagram 400 illustrating operation of a possible implementation of an embodiment for monitoring social characteristics associated with an event. The flow begins at block 402 and proceeds to block 404, where an event code is entered at an audience member's client. Alternatively or additionally, an event code is automatically determined from, for example, an audience member's location, an interaction with the thin-client 308, or other action. Once the event code is determined at block 404, the audience member's interactions are monitored (block 406) in relation to the event associated with the code entered in block 404. In block 408, the interactions monitored in block 406 are forwarded as data to the server computer 208 where they are analyzed. One or more of the interactions are displayed, for example, to the presenter or an administrator monitoring the presentation, at block 410. Based on the received data, actions can be generated (at block 412) and delivered to audience members. For example, an action can be an audience survey, a multiple choice or other form of question, a request for a presenter and/or presentation rating, or other feedback, etc. The flow ends at block 414.

Figure 5:
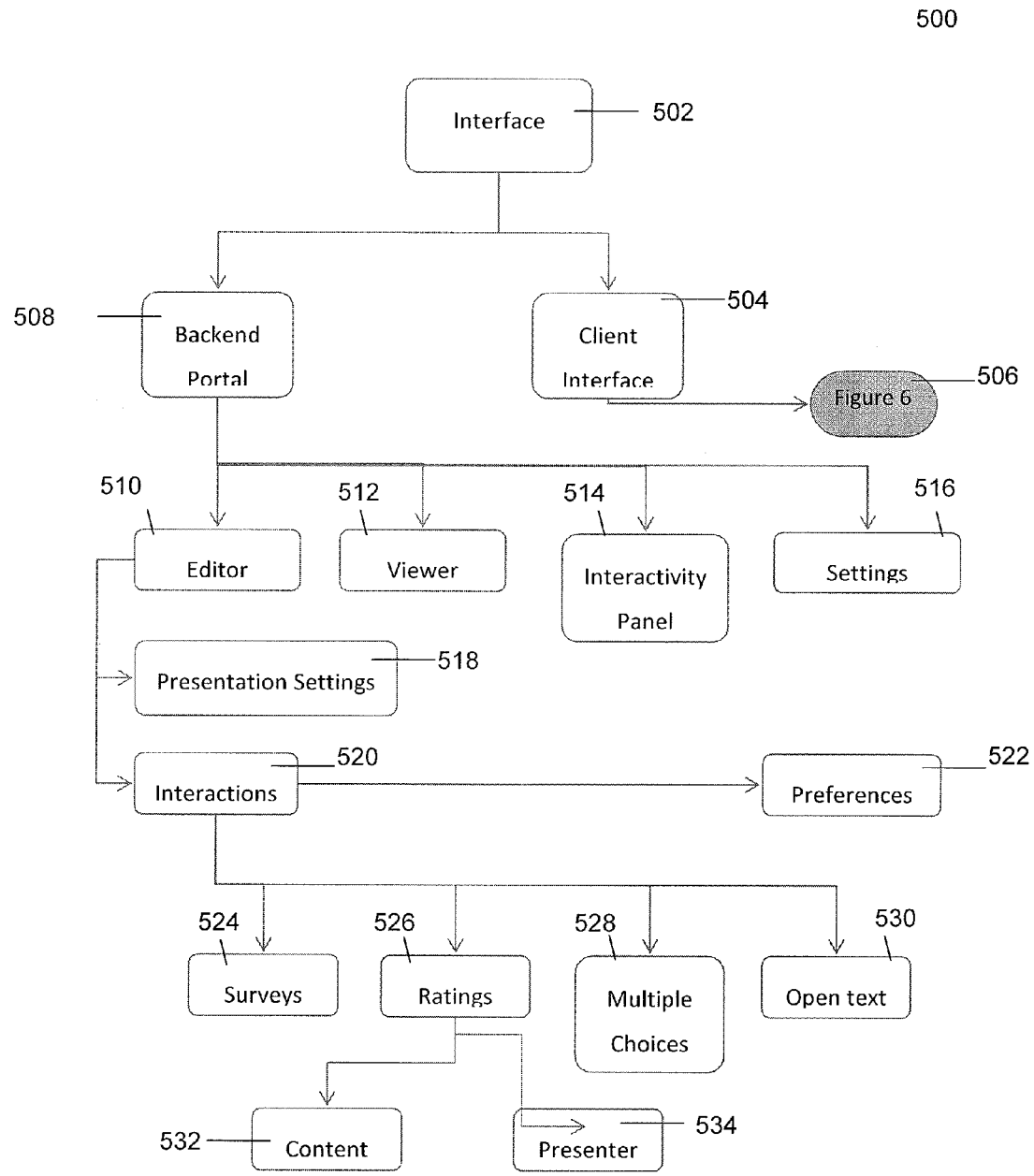
FIG. 5 is a flow diagram illustrating an exemplary embodiment that may be implemented for a presenter's platform to interact with an audience.

FIG. 5 is a flow diagram 500 illustrating an exemplary embodiment that may be implemented for a presenter's platform that is used to interact with an audience. The presenter or user ("presenter") can use an interface 502, such as interface 306 (described above). For example, an interface 502 may be a server, laptop, or other computing device capable of interfacing with backend portal 508 for accessing the core framework 302. The interface 502 is capable of communicating with the clients 504. For example, the presenter may present a slide presentation via the client interface 504, which is used to communicate a slide presentation to a display at the client 504, as further detailed in FIG. 6. If the presenter selects or enters the backend portal 508, the presenter can edit the slide presentation (at block 510), preview a slide presentation to see an audience member's perspective of the presentation (at block 512), view an interactive panel 514 as further described below, or adjust settings (at block 516), such as user account settings to adjust a username and password, add/remove viewers/collaborators to a presentation, and link third-party accounts (e.g., Facebook®, LinkedIn®, etc.). Editing a presentation (block 510) allows a presenter to edit presentation settings (at block 518), such as whether a presentation is shared or viewable to an audience, and various options for event codes (e.g., when they expire. For example, at block 522 the presenter may set various presenter-based preferences and/or audience-based preferences to affect a level of engagement. For example, one presenter-based preference prevents or allows the display of audience interactions at the interactivity panel 514, and when the audience interactions are displayed. Additionally, a presenter may decide that some slides can receive audience feedback while others cannot. In another example, a presenter may choose that audience feedback is only permitted at certain times during the presentation (e.g., only during a question and answer session). One example of an audience-based preference is whether and when an audience member may submit a question to the presenter. In another option, a presenter may choose to associate and/or enable different types of audience interactions with a slide presentation or subset of slides within a presentation. For example, a presentation can be associated with one or more audience surveys 524, ratings 526, multiple choice questions 528, or free form open text 530. A rating 526 may be associated with rating the content 532 of the presentation or rating the presenter 534.

Figure 6:
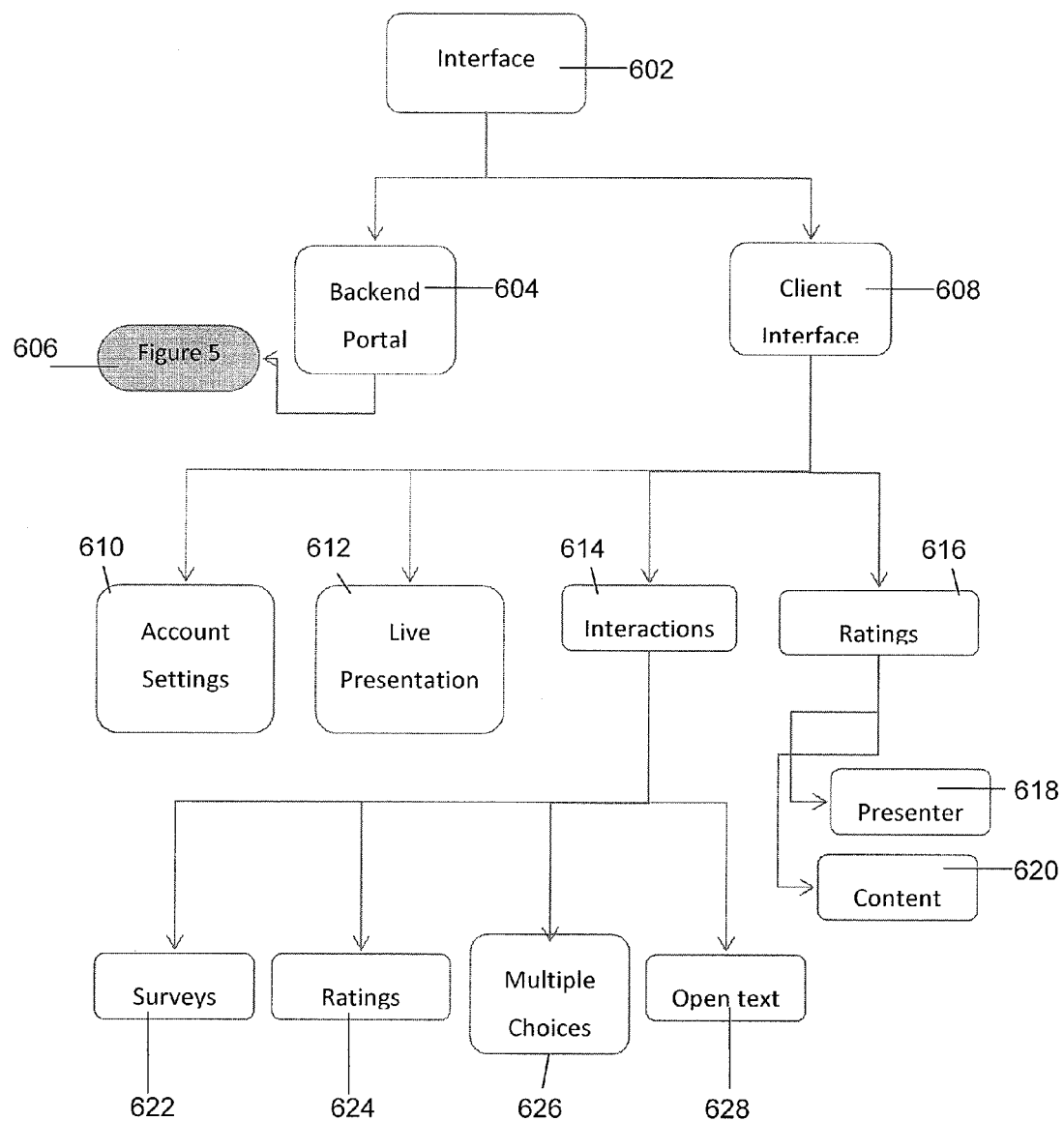
FIG. 6 is a flow diagram illustrating an exemplary embodiment that may be implemented for an audience member's platform to interact with the presentation.

FIG. 6 is a flow diagram 600 illustrating an exemplary embodiment that may be implemented for an audience member's platform that is used to interact with a presentation. Interface 606 connects the client interface 608 to the backend portal 604, for communicating with the core network 302. The backend portal 604 is similar to backend portal 508; interface 602 is similar to interface 502; and client interface 608 is similar to client interface 504, which are described above. Client interface 608 allows an audience member to set various settings for interacting with a presentation. For example, at block 610 account settings can be managed (e.g., linking third-party accounts, such as Facebook®, etc.), modifying username and passwords, and selecting an avatar. At block 612 one or more presentations can be enabled or disabled for audience interaction. This is useful when, for example, multiple presentations are available for audience interaction, such as attending a conference, and an audience member wants to specify which presentations with which they wish to interact. Regardless of whether the audience member interacts with one or more presentations, they can select the type of interaction to utilize with a certain presentation, such as a survey 622, rating 624, multiple choice questions 626, or open text 628. For each presentation, one or more of the interaction types 622-628 may be available for selection and/or configuration.

Figure 7:
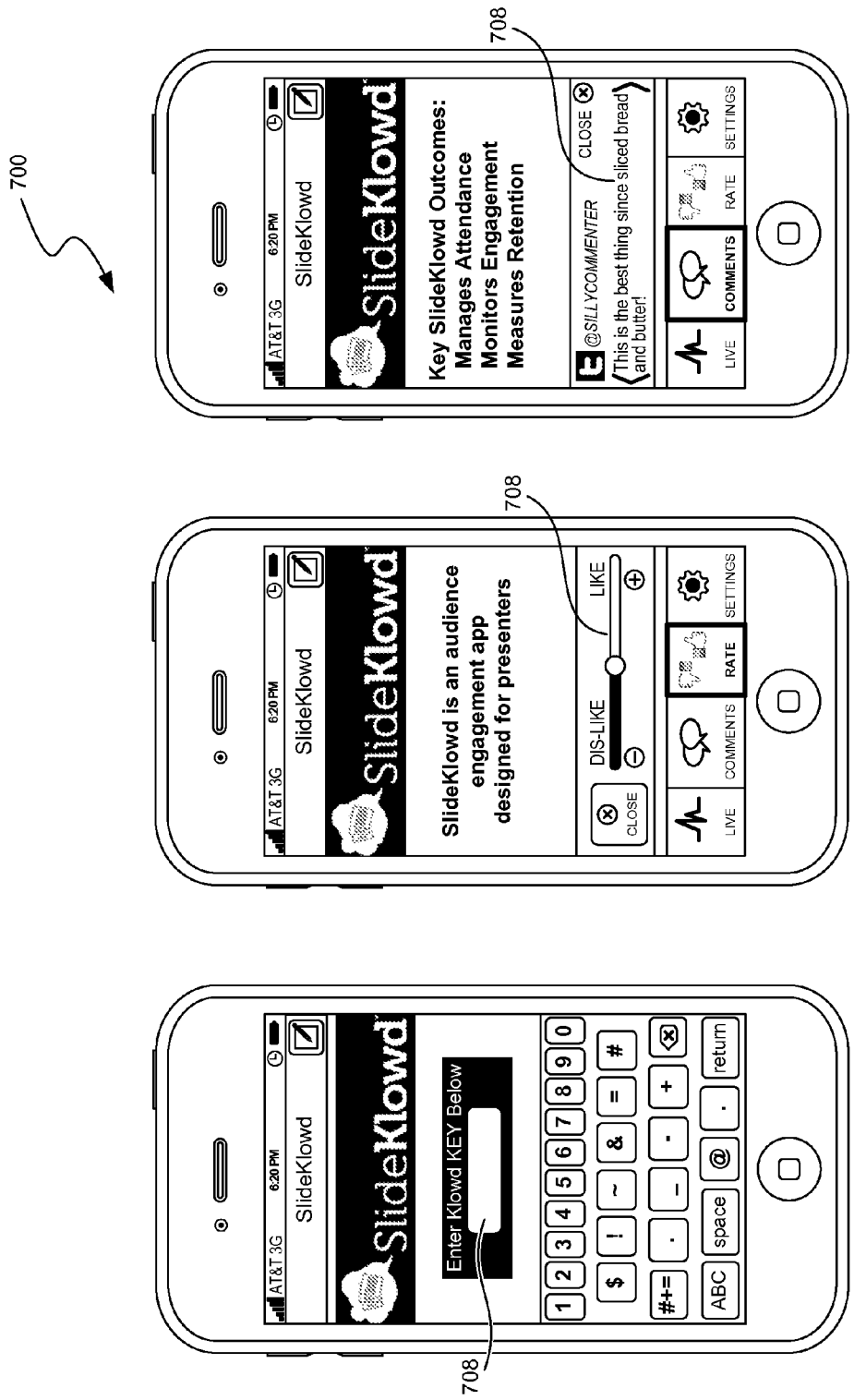
FIG. 7 shows various embodiments of a client computer that is capable of implementing various aspects of the described technology.

FIG. 7 shows various embodiments 700 of a client computer (e.g., a thin-client) that is capable of implementing various aspects of the described technology. In one embodiment 702, the client displays to the audience member an event code 708. As described above, a presenter may select that an event code 708 be entered by an audience member before they can view or interact with the presentation. An event code 708 may be any combination of indicators capable of being received by the client, such as alpha-numeric symbols. In another embodiment 704, an interactive rating display 710 is presented at the client 704. In this embodiment, an audience member is presented a scroll bar that can be manipulated to indicate how much the audience member "Likes" or "Dislikes" some aspect of the presentation. For example and as described in FIG. 5, the presenter may associate a question with a slide, such as whether a particular product is desirable. An audience member may manipulate the slider bar 710 to interact with the presenter by indicating the member's affinity for that product, for example. In another embodiment, the client 706 presents audience interactivity across a display 712 of the client 706. For example, the disclosed technology can receive interactions from one or more audience members, process that information (e.g., determine some characteristic from the compiled information), and send some or all of the processed information back to the audience's client 706. In another embodiment, the display 712 is used to display less processed or unprocessed information, such as displaying audience comments or third-party/quasi-third-party information, such as displaying Twitter® comments associated with the presentation.

Figure 8:
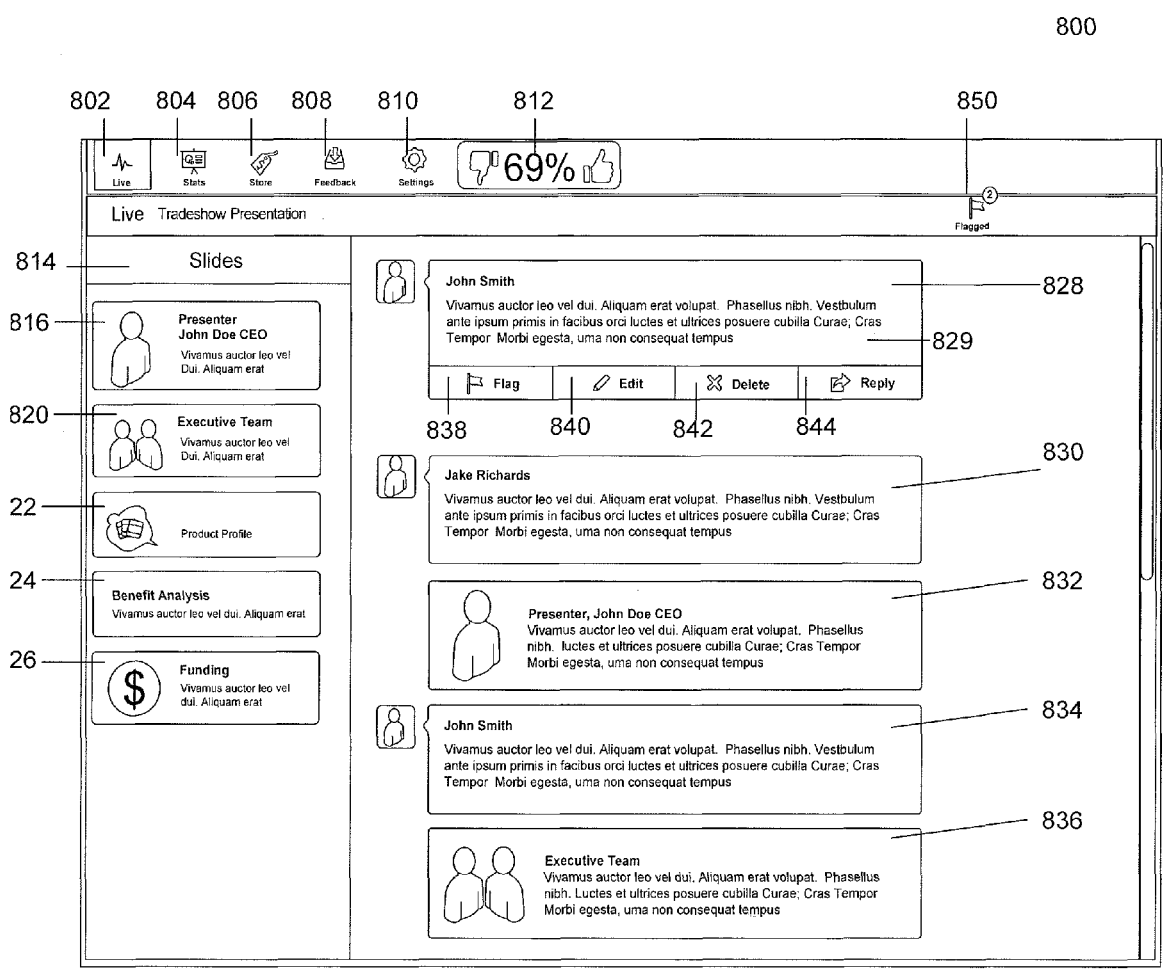
FIG. 8 is an exemplary interactivity panel that illustrates an embodiment used by the presenter to interact with an audience.

FIG. 8 is an exemplary interactivity panel 800 that illustrates an embodiment of the interactivity panel 514 used by the presenter or an administrator, herein referred to as "presenter," to interact with an audience. Options 802-810 can be selected to further configure a presentation and interact with an audience. For example, a settings option 810 allows the presenter to establish various configurations, such as those settings 516 and/or 518, described above. The feedback option 808 can be used to set the desired level and/or type of audience interactivity that the presenter desires to receive from the audience. The store option 806 is an optional feature that can be used to associate ads/promotions with a presentation. The stats option 804 shows graphs and statistical representations of received interactions, such as the percentage of the audience that "Liked" an aspect of the presentation or the results of an audience rating, for example. The live option 802 indicates when one or more slides are in "live mode" and can be seen by the audience on their client devices. In one embodiment, the live option 802 becomes selected (e.g., highlighted) when at least one slide is "live." In another embodiment, selecting the live option 802 shares a slide with the audience (i.e., places the slide into "live mode"). Slide indicator 814 is used to show a preview of the slides 816-826 in order of their presentation. For example, slide 816 is presented before slide 820, which is presented before slide 822. Other orderings of the slides are contemplated. Audience interactions 828-836 are interactions, initiated from an audience member's client that are displayed to the presenter on the interactivity panel 800. Audience interactions 828-836 typically are displayed in the order that they are received. Alternatively or additionally, the order can be based on a different priority level, which can be changed using the settings option 810, for example. The audience interactions 828-836 each have associated options 838-844 that enable the presenter to communicate with audience members who submit an interaction. For example, a flag option 838 is used to select one or more flags to indicate how a presenter desires to interact with a particular audience interaction 828. For example, in one embodiment a flag can indicate that the presenter has no time to discuss a particular audience member's question/comment, but will try to discuss it later. Another flag option 838 can indicate that a slide is a "comment slide," which is displayed (i.e., shared) to the rest of the presenter's audience so that all (or at least some) of the audience can view another audience member's audience interaction 828-836. Another flag option 838 allows the presenter to group together different audience interactions 828-836. The grouped interactions can then be used to create one or more "comment slides" or otherwise interacted with as a unit. The edit option 840 can be used for one-to-one communication between the presenter and the audience member, for example, when it is not desirable to create a "comment slide" to share with the entire (or subset) of the presenter's audience. The delete option 842 allows the presenter to remove an audience interaction 828 from the interactivity panel 800. The reply option 844 allows the presenter to select editable, pre-configured responses for quickly replying to an audience member.

Figure 9:
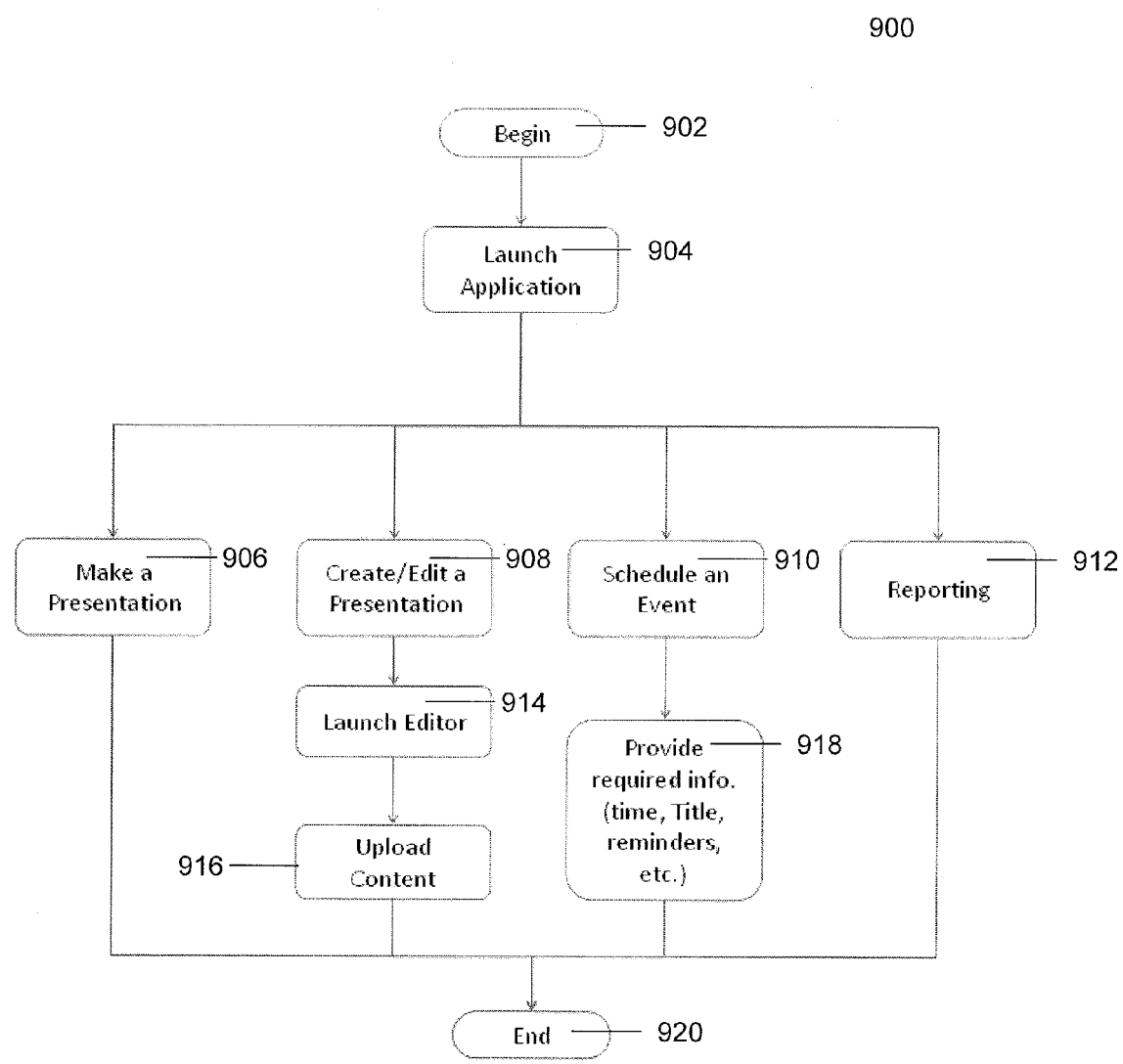
FIG. 9 is a flow diagram illustrating the operation of a possible implementation of an embodiment for creating a presentation that may employ aspects of the described technology.

FIG. 9 is a flow diagram 900 illustrating operation of a possible implementation of an embodiment for creating a presentation that may employ aspects of the described technology. The flow begins at block 902, after which an application is launched (at block 904) for creating a slide presentation for use with the described technology. Once the application is launched, the user can make a presentation (block 906), create/edit a presentation (block 908), schedule an event (block 910) or generate a report (912). If the user chooses to make a presentation (block 906), various settings can be selected, such as selecting a title for the presentation or sharing options for sharing the presentation with one or more other users, etc. In some situations, a presentation already exists and the user may wish to reuse that presentation with the described technology. Block 924 indicates that a user may import a presentation for use with the described technology. For instance, a presentation created within a different system, such as Google® Docs or PowerPoint®, may be imported for use with the described technology. Additionally, one user may import a presentation created by a different user of the described technology. Regardless of whether a presentation is imported, the user has the option (block 908) to create all or part of a new presentation using the described technology. If the user chooses to create/edit a presentation (block 908), an editor can be launched (block 914), and content can be uploaded (block 916). If the user chooses to schedule an event (block 910), the user can provide event information, such as the time, title, and reminders associated with the event, at block 918. The flow ends at block 920.

FIG. 10 is flow diagram illustrating operation of a possible implementation of an embodiment for creating a presentation that may employ aspects of the described technology. The flow begins at block 1002, after which an application is executed (at block 1004) for creating a slide presentation for use with the described technology. Once the application is launched, the user can make a presentation (block 1006), generate a report (1012), create/edit a presentation (block 1008), or schedule an event (block 1010). If the user chooses to create/edit a presentation (block 1008), an editor can be launched (block 1014), and content can be generated (block 1016). If the user chooses to schedule an event (block 1010), the user can provide event information, such as the time, title, and reminders associated with the event, at block 1018. The flow ends at block 1020.

Further details on at least one embodiment of the described technology are provided in the documents appended herewith, which form part of the present disclosure.

In general, the detailed description of embodiments of the described technology is not intended to be exhaustive or to limit the technology to the precise form disclosed above. While specific embodiments of, and examples for, the technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. The elements and acts of the various embodiments described herein can be combined to provide further embodiments.

These and other changes can be made to the described technology in light of the above Detailed Description. While the above description details certain embodiments of the technology and describes the best mode contemplated, no matter how detailed the above appears in text, the described technology can be practiced in many ways. Details of the described technology may vary considerably in its implementation details, while still being encompassed by the technology disclosed herein. As noted above, particular terminology used when describing certain features or aspects of the described technology should not be taken to imply that the terminology is being redefined herein to be restricted to any specific characteristics, features, or aspects of the technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

We claim:

1. A computer implemented method, comprising:
collecting audience data by receiving indications of audience member actions each performed at one of a plurality of computing devices remote from a source of a presentation;
determining an intensity and/or emotional engagement level of an audience with the presentation based on one or more of the indications of audience member actions;
comparing the determined intensity and/or emotional engagement level to a threshold level of intensity and/or emotional engagement; and
in response to the determined intensity and/or emotional engagement level reaching the threshold level;
generating content based on the determined intensity and/or emotional engagement level; and
sending at least a portion of the content to one or more of the plurality of audience members.

2. The method of claim 1 wherein determining the intensity and/or emotional engagement level is further based on a real-time indication of one or more audience member's preference for, and/or participation in, a presently occurring event.

3. The method of claim 1 wherein determining the intensity and/or emotional engagement level is further based on a real-time indication of one or more audience member's preference for, and/or participation in, a previously occurred event.

4. The method of claim 2 wherein the event is a venue-centric event.

5. The method of claim 2 wherein the event is a slide-based presentation.

6. The method of claim 2 wherein the event is a politically rally.

7. The method of claim 2 wherein the event is a sporting event.

8. The method of claim 2 wherein the event is a concert.

9. The method of claim 1 wherein the determined intensity and/or emotional engagement level is an emotional engagement level that is based on a determination of an emotion associated with multiple of the audience members.

10. The method of claim 1 wherein the indications of audience member actions used to determine the intensity and/or emotional engagement level include indications of one or more audience member responses to a specified portion of the presentation.

11. The method of claim 1 wherein the indications of audience member actions used to determine the intensity and/or emotional engagement level include indications of one or more audience member opinions.

12. The method of claim 1 wherein at least one of the plurality of computing devices is a handheld device.

13. The method of claim 1 wherein at least one of the plurality of computing devices is a mobile phone.

14. The method of claim 1 wherein at least one of the plurality of computing devices is a tablet.

15. The method of claim 1 wherein the content has one or more requests for an answer to a question and/or one or more requests for audience feedback, and wherein the content is configured to be displayed at one or more of the plurality of remote computing devices.

16. The method of claim 1 wherein the content has one or more advertisements configured to be displayed at one or more of the plurality of remote computing devices.

17. The method of claim 1 further comprising tracking one or more of the audience members at an event based on at least a portion of the collected audience data.

18. The method of claim 1 further comprising receiving data indicating:
an acceptance of a product and/or service offered in the content; and/or
an acceptance of an opt-in question in the content.

19. The method of claim 1 wherein at least some of the audience members actions are interactions with one or more social media providers.

20. The method of claim 19 wherein the intensity and/or emotional engagement level is determined by parsing portions of free-form text and/or semantics from the interactions with the one or more social media providers and analyzing the parsed portions.

21. The method of claim 1 wherein determining the intensity and/or emotional engagement level is based on multiple of the indications of audience member actions, wherein at least a first of the multiple indications of audience member actions correspond to a first audience member and at least a second of the multiple indications of audience member actions correspond to a second audience member different from the first audience member.

22. A computer system comprising:
a memory:
one or more processors;
an event management component, executed by the one or more processors, configured to—
determine various audience intensity and/or emotional engagements at corresponding points during an event, wherein each audience intensity and/or emotional engagement is based on one or more audience member actions; and
an administrative component, executed by the one or more processors, configured to—
select one of the various audience intensity and/or emotional engagements based on the selected audience intensity and/or emotional engagement being at or above a pre-determined level;
determine, based on the selected audience intensity and/or emotional engagement, a type of content to send; and
select a content item corresponding to the determined type of content, wherein the content item is based on the selected audience intensity and/or emotional engagement; and
an interface configured to send the selected content item to one or more of the audience members.

23. The system of claim 22,
wherein the event management component is further configured to receive audience data including indications of the actions performed by the audience members, and
wherein each of the one or more audience member actions is performed at a computing device, corresponding to one of the audience members.

24. The system of claim 22 wherein the type of content is an offer for a product and/or an offer for a service.

25. The system of claim 22 wherein the type of content is a slide presentation.

26. The system of claim 22 wherein the selected audience intensity and/or emotional engagement is an audience emotional engagement that is based on a determination of an emotion associated with at least a portion of the audience members at the event.

27. At least one, non-transitory computer-readable storage medium storing instructions that, when executed by at least one data processing device, causes the at least one data processing device to perform operations for determining audience engagement, the operations comprising:
- receiving indications of audience member actions each performed at one of a plurality of computing devices remote from a source of a presentation;
- identifying, based on at least one of the indications of audience member actions, one or more naturally occurring human characteristics;
- identifying an engagement value indicating audience engagement with the presentation, wherein the engagement value is based on at least a portion of the identified one or more naturally occurring human characteristics;
- comparing the determined engagement value to an established engagement threshold level;
- in response to the determined engagement value reaching the established engagement threshold level;
  - identifying content associated with the engagement threshold level; and
  - sending the content to the one or more of the computing devices remote from a source of a presentation.

28. The computer-readable storage medium of claim 27 wherein at least one of the identified one or more naturally occurring human characteristics is an emotion of at least one of the audience members.

29. A computer implemented method for determining an offer based on a level of engagement of at least one member of an audience viewing an event, the method comprising:
- sending, over a network, indications of audience member actions relating to the event, wherein the audience member actions are preformed on computing devices remote from a source of the event;
- receiving one or more offers, wherein content of the one or more offers is based on:
  - a determination of an engagement level based on the provided indications of audience member actions; and
  - a determination that the engagement level is at least at an established engagement threshold value;
- displaying the one or more offers;
- sending, to a remote computing device, an indication of a selected offer of the one or more offers;
- in response to sending the indication of the selected offer, receiving, via the remote computing device, data relating to the selected offer; and
- displaying the data.

30. The method of claim 29,
- wherein the engagement level provides an indication of at least one audience member's natural emotion, opinion, answer to a question, and/or amount of energy,
- wherein the offer is for a product and/or service,
- wherein the indication of the selected offer is an acceptance of the selected offer, and
- wherein the data relating to the selected offer includes information regarding the acceptance of the selected offer.

31. The method of claim 30 wherein the engagement level is based on a plurality of audience members' perceptions of the event.

32. The method of claim 29,
- wherein the engagement level is at least one audience member's natural emotion, opinion, answer to a question, and/or amount of energy,
- wherein the event is a presentation,
- wherein the offer is a solicitation for answer to a question, poll, and/or survey, and
- wherein the data relating to the selected offer includes feedback information.

33. A server, comprising:
- means for collecting audience data including indications of actions performed by audience members at a plurality of computing devices remote from a source of a real-time presentation;
- means for determining an engagement level of at least one audience member viewing the real-time presentation, wherein the engagement level is based on at least one of the indications of actions performed by audience members;
- establishing an engagement threshold value;
- comparing the determined engagement level to the established engagement threshold value; and
- in response to the engagement level reaching the established engagement threshold value:
  - generating content based on the engagement level; and
  - sending the content to the at least one source.

34. The server of claim 33,
- wherein the audience data includes a real-time indication of the at least one audience member's preference for the real-time presentation, and
- wherein the preference is associated with a natural emotion, opinion, answer to a question, and/or amount of energy of the at least one audience member.

35. A client, comprising:
- means for sending indications of audience member actions relating to a presentation, wherein the audience member actions are performed on the client which is remote from a source of the presentation;
- means for receiving content, wherein the content is based on:
  - a determination of an engagement level of at least one audience member viewing the presentation, wherein the engagement level is based at least in part on the indications of audience member actions; and
  - a determination that the engagement level is at least at an established engagement threshold value; and
- means for displaying the content.

36. The client of claim 35,
- wherein the indications of audience member actions include a real-time indication of the at least one audience member's preference for the presentation, and
- wherein the preference is associated with a natural emotion, opinion, answer to a question, and/or amount of energy of the at least one audience member.

* * * * *

UNITED STATES PATENT AND TRADEMARK OFFICE
CERTIFICATE OF CORRECTION

PATENT NO. : 9,137,295 B2  
APPLICATION NO. : 13/711533  
DATED : September 15, 2015  
INVENTOR(S) : Kenneth Holsinger et al.

Page 1 of 1

It is certified that error appears in the above-identified patent and that said Letters Patent is hereby corrected as shown below:

IN THE SPECIFICATION

In column 3, line 23, delete "and or" and insert -- and/or --, therefor.

IN THE CLAIMS

In column 13, line 32, in claim 29, delete "preformed" and insert -- performed --, therefor.

Signed and Sealed this
Sixteenth Day of February, 2016

Michelle K. Lee
*Director of the United States Patent and Trademark Office*